United States Patent [19]

Miller

[11] 3,769,862

[45] Nov. 6, 1973

[54] WIRE NUT TOOL
[75] Inventor: Leslie T. Miller, Murray, Utah
[73] Assignee: Speedriver Tool Corporation, Salt Lake City, Utah
[22] Filed: May 17, 1972
[21] Appl. No.: 254,077

Related U.S. Application Data

[63] Continuation-in-part of Ser. No. 85,074, Oct. 29, 1970, abandoned.

[52] U.S. Cl.................. 81/90 D, 81/119, 145/61 G
[51] Int. Cl........................ B25b 13/06, B25b 13/50
[58] Field of Search............. 81/119, 121 R, 177 G, 81/122, 90 R, 90 B, 90 D, 90 E; 145/61 G, 50 F

[56] References Cited
UNITED STATES PATENTS

| | | | |
|---|---|---|---|
| 445,451 | 1/1891 | Miller............................. | 81/121 R |
| 2,733,456 | 2/1956 | Howell............................. | 81/71 X |
| 1,752,703 | 4/1930 | Simson............................ | 145/66 X |
| 2,198,455 | 4/1940 | Mueller et al.................... | 81/119 X |
| 1,397,876 | 11/1921 | Meldal............................. | 81/90 D |
| 3,086,414 | 4/1963 | Nardi.............................. | 81/90 D |

FOREIGN PATENTS OR APPLICATIONS 1,083,206 6/1954 France............................ 81/121 R Primary Examiner—James L. Jones, Jr.
Assistant Examiner—Roscoe V. Parker
Attorney—William S. Britt et al.

[57] ABSTRACT

A wire nut tool which includes a sleeve having an open end and an opposite connecting end, a first cavity in the sleeve proximate the open end sized to receive at least a portion of a wire nut, and a second opening proximate the opposite end of the sleeve sized to receive a second wire nut. Slots are formed in the sidewalls of the sleeve proximate the open end for receiving the turning wings of a first wire nut and second slots are positioned in the sidewalls of the sleeve proximate its connecting end for receiving the turning wings of a second smaller sized wire nut.

15 Claims, 8 Drawing Figures

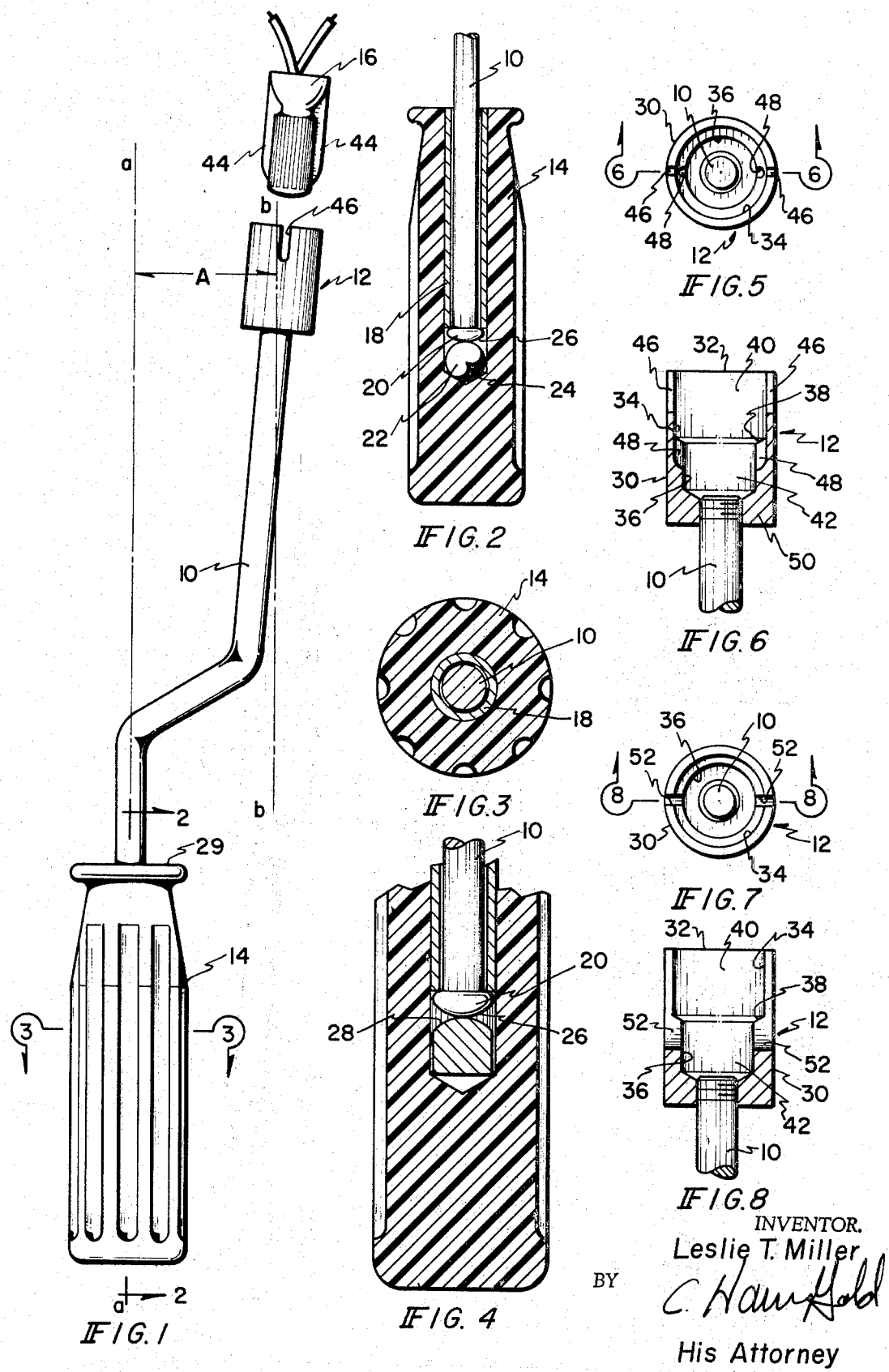

WIRE NUT TOOL

RELATED APPLICATIONS

This application is a continuation-in-part of application U.S. Ser. No. 85,074, filed Oct. 29, 1970 by applicant and now abandoned.

BACKGROUND OF THE INVENTION

In recent years the use of wire nuts has become very popular for connecting electrical wires together. These nuts generally comprise a threaded connecting socket covered with a pliable insulation material having a protective flange or sleeve which extends over a portion of the wires connected by the nut. Most wire nuts presently in use are also provided with outwardly extending turning wings or fins spaced on opposite sides of the nut to aid the installer in turning the nut. Such nuts are generally screwed with the fingers onto the the ends of the wires to be connected. As might be expected, electricians are often required to install a great number of the nuts every day, thereby causing their fingers to become tender and sore. Attempts have been made to install the nut with wrenches and pliers of various types; however, such tools have generally proven to be ineffective and often result in a greater installation time than when only the fingers are used.

Accordingly, it is a principal objective of this invention to provide a tool useful for installing various sized wire nuts.

In its broadest form the invention comprises a wire nut tool which includes a sleeve having an open end, an opposite connecting end, first interior sidewalls extending from said open end to a midportion of the sleeve forming a first cavity proximate the open end of the sleeve sized to receive at least a portion of a first wire nut, a flange wall extending from the first interior sidewalls proximate said mid-portion of said sleeve inwardly towards an interior portion of said sleeve, and second interior sidewalls extending from said flange wall to a position proximate the connecting end of said sleeve forming a second cavity between said flange wall and said connecting end sized to receive at least a portion of a second wire nut passed endwise through said first cavity and into said second cavity; first and second slots formed in said first interior sidewalls on opposite sides of said sleeve sized to receive the outwardly extending wings of said first wire nut; and first and second slots formed in said second interior sidewalls on opposite sides of said sleeve extending from said flange wall to a position proximate the connecting end of said sleeve and sized to receive the outwardly extending wings of said second wire nut.

In a preferred embodiment of the invention, the wire nut tool is affixed to an offset for levered shank having a rotatable handle.

BRIEF DESCRIPTION OF THE DRAWINGS

So that the invention may be more readily understood and carried into effect, reference is made to the accompanying drawings which are offered by way of example only and are not to be taken as limiting the invention, the scope of which is defined by the appended claims which are intended to embrace equivalent structures.

FIG. 1 is a plan elevational view of the preferred wire nut tool of this invention with an electrical nut positioned to be received in the working end of the tool.

FIG. 2 is a sectional view taken in the plane of line 2—2 of FIG. 1 looking in the direction of the arrows.

FIG. 3 is a sectional view taken in the plane of line 3—3 of FIG. 1 looking in the direction of the arrows.

FIG. 4 is a partial sectional view of one type of tool handle showing a modified bearing structure.

FIG. 5 is a top view of the wire nut turning wrench of this invention.

FIG. 6 is a sectional view taken in the plane of line 6—6 of FIG. 5 looking in the direction of the arrows.

FIG. 7 is a top view of a modified wire nut turning wrench of this invention.

FIG. 8 is a sectional view taken in the plane of line 8—8 of FIG. 7 looking in the direction of the arrows.

DESCRIPTION OF THE PREFERRED EMBODIMENT

FIG. 1 is an illustration of the wire nut tool of this invention which includes an offset or levered shank 10 with a wire nut turning wrench 12, hereinafter described, affixed at one end and a handle 14 rotatably mounted at its other end. A conventional wire nut 16 secured to electrical wires is positioned to be received within the working end of the wrench 12.

Shank 10 is rotatably mounted within sleeve 18 which is embedded in handle 14 so that flange 20 coacts with the end of sleeve 18 or bearing 22 positioned in bearing race 24. By using a structure of this type shank 10 easily rotates within sleeve 18 even when a substantial pressure is applied thereto and when a tension is applied to the shank its flange 20 rides on the end of sleeve 18 thus preventing it from being pulled out of sleeve 18.

Handle 14 is preferably constructed from a moldable or shaped material such as plastic, wood, metal, etc. Relatively soft handle construction materials can be used for the construction of handle 14 in that the materials only act as a support for sleeve 18 and bearing 22 which in turn are in a metal-to-metal contact with rotating shank 10. It is also within the scope of this invention to cover handle 14 with a material that is substantially non-conductive to the flow of electrical current for safety purposes.

Flange 20 is preferably provided with a convex end surface 26 which forms a point contact with the convex surface 28 of bearing 22. While bearing 22 may be of any shape, a ball bearing is generally preferred in that it rotates in race 24 to minimize bearing wear. Use of a cylindrically shaped bearing of the type shown in FIG. 4 is also a preferred structure since this structure allows sleeve 18 to be placed at a predetermined position within handle 14.

Sleeve 18 is constructed from a metal tubing such as steel, copper, brass, aluminum, etc. Its inside diameter is slightly larger than the outside diamter of shank 10 to allow easy rotation therein while minimizing lateral movement of the shank. The sleeve is embedded in handle 14 for a distance which is sufficient to prevent it from breaking through the handle when a lateral force is applied thereon. The outside end of sleeve 18 preferably is positioned proximate handle end 29.

The shank 10 of this invention is provided with an offset A between the center line a-a of handle 14 and tool end center line b—b to form a lever or crank. Additionally, the wire nut wrench is preferably positioned at an angle of about 2° to 30° with handle center line a—a.

Wire nut turning wrench 12 includes a sleeve 30 having an open receiving end 32 and an opposite connecting end which is secured to shank 10 in a fashion hereinafter described. The interior of sleeve 30 defined by first sidewalls 34, second sidewalls 36, and inwardly extending flange wall 38 define the boundaries of a first interior cavity 40 sized to receive at least a portion of a first wire nut and a second interior cavity 42 sized to receive at least a portion of a smaller sized wire nut. Sidewalls 34 and 36 are preferably cylindrically shaped such that the opposite sides of walls 34 and 36, respectively, are substantially parallel. Flange wall 38 extends inwardly from sidewalls 34 to an interior portion of sleeve 30. Preferably, flange wall 38 is also beveled or angled towards the connecting end of sleeve 12 such that when the end of a wire nut is urged against the flange wall, it slides easily thereover into cavity 42.

Flange wall 38 preferably extends only a short distance inwardly so that the diameter of the second interior cavity 42 is only slightly smaller than first interior cavity 40; for example, first interior cavity 40 preferably has an interior diameter of about one-half inch and second interior cavity 42 has preferably an interior diameter of about three-eighths inch. The ratio of diameter of cavity 42 to cavity 40 is about 3:4.

Cavity 42 is further characterized by being free of obstructions between bevel 38 and base of the cavity. Cavity 42 is sized to receive a wire nut of smaller diameter than the wire nuts which fit within cavity 40. Since the smaller wire nuts are of a smaller diameter than cavity 40, the smaller wire nuts must slip sufficiently deep into cavity 42 so that the wings of the wire nut engage notches 48. Obstructions within cavity 42 would prevent engagement of the smaller wire nut wings with notches 48. Notches 48 are preferably a sufficient distance below bevel 38 so that a positive engagement can occur between notches 48 and the wings of smaller wire nuts. It is generally preferred that notches 48 extend about halfway down sidewall 36.

As heretofore indicated, wire nuts 16 are generally provided with outwardly extending wings or fins 44. To accommodate this structure, notches or slots 46 are positioned in sidewalls 34 preferably extending from the open end of sleeve 30 to an intermediate position between said open end and flange wall 38; for example, about halfway between flange wall 38 and the open end. Also, notches 48 are formed in sidewalls 36 extending from flanged wall 38 to a position proximate the connecting end of sleeve 30. Most preferably, notches 48 extend inwardly into sidewalls 36 to a position substantially aligned with sidewalls 34. Inasmuch as notches 48 cannot be easily viewed when the wire nut wrench of this invention is in use, it is preferred to position notches 48 in mutual alignment with notches 46. In an alternative preferred structure, a single notch or slit 52 can be formed on opposite sides of the sleeve 30 which extends from the sleeve's open end 30 to a position proximate its opposite connecting end (See FIGS. 7 and 8).

The structure illustrated in FIGS. 7 and 8 is advantageous, inasmuch as only a pair of opposed slot is required to accommodate the wings of both large and small wire nuts. Slots 52 can be formed in one cut while formation of slots 46 and notches 48 may require several operations. Also, slots 52 allow continuous visual alignment of the wire nut wings regardless of wire nut size. Slots 52 extend a sufficient distance below bevel wall 38 to provide positive engagement with the wings of smaller wire nuts. Slots 52 extend intermediately between bevel wall 38 and the base of cavity 42, and preferably slot 52 extends about halfway down sidewall 36.

While it is apparent that the wire nut wrench can be used without connecting it to a driving means of the type herein described, it is preferred to use such structure. For this purpose, sleeve 30 can be affixed to shank 10 by securing a tapped and threaded end plate 50 to the connecting end of sleeve 30. Shank 10 can then be screwed into plate 50 as shown in FIG. 6. Tool 12 can, of course, be formed as a unitary structure by, for example, casting it.

In using the tool of this invention, wires to be electrically connected are passed into wire nut 16. The open end of sleeve 38 is then passed over the nut and the sleeve is rotated until the nut's wings 44 pass into appropriately sized notches 46, 48 or 52. The nut is then screwed into place on the electrical wires by rotating shank 10. Substantial power can be appplied to the work because of the offset in the shank, and unlike many tools heretofore used, the tool of this invention does not require its operator to use two hands for rotation.

I claim:

1. A wire nut wrench which comprises a sleeve having an open end, an opposite connecting end, first cylindrical interior sidewalls extending from said open end to a mid-portion of said sleeve forming a first cavity proximate said open end of said sleeve sized to receive at least a portion of a first wire nut, a flange wall extending inwardly to an interior portion of said sleeve from said first interior sidewall proximate said mid-portion of said sleeve, and second cylindrical interior sidewalls extending from said flange wall to a position proximate said connecting end of said sleeve forming a second obstruction-free cavity between said flange wall and said connecting end of said sleeve sized to receive at least a portion of a second wire nut passed endwise into said second cavity through said first cavity; first and second slots formed in said first interior sidewalls on opposite sides of said sleeve sized to receive the outwardly extending wings of said first wire nut; and first and second slots formed in said second interior sidewalls on opposite sides of said sleeves extending from said flange wall toward said connecting end of said sleeve sized to receive the outwardly extending wings of said second wire nut.

2. The wire nut wrench of claim 1 wherein said flanged wall is angled towards said connecting end of said sleeve.

3. The wire nut wrench of claim 2 wherein said first and said second slots in said first interior sidewalls are in mutual alignment with said first and said second slots in said second interior sidewalls.

4. The wrie nut wrench of claim 3 wherein said first slot in said first interior sidewall is in communication with said first slot in said second interior sidewall and said second slot in said first interior sidewall is in communication with said second slot in said second interior sidewall.

5. The wire nut wrench of claim 1 wherein means are connected to said sleeve for rotating said sleeve.

6. The wire nut wrench of claim 5 wherein said means for rotating said sleeve comprises a levered shank fixedly attached at one end to the end of said sleeve opposite from said open end.

7. The wire nut wrench of claim 6 wherein the other end of said shank is mounted in rotation means for rotating said shank.

8. The wire nut wrench of claim 7 wherein said rotation means comprises a tool handle; an elongated sleeve fixedly imbedded in said handle with said shank rotatably mounted in said elongated sleeve; a flange affixed to said other end of said shank which coacts with the end of said elongated sleeve imbedded in said handle; and a bearing positioned in a bearing race in the handle to coact with said flange.

9. The wire nut wrench of claim 8 wherein said bearing is a ball bearing.

10. The wire nut wrench of claim 9 wherein the flange has a convex surface adapted to coact with said bearing.

11. The wire nut wrench of claim 8 wherein said first and said second slots in said first interior sidewalls are in mutual alignment with said first and said second slots in said second interior sidewalls.

12. The wire nut wrench of claim 11 wherein said first slot in said first interior sidewall is in communication with said first slot in said second interior sidewall and said second slot in said first interior sidewall is in communication with said second slot in said second interior sidewall.

13. The wire nut wrench of claim 1 wherein said first cavity and said second cavity have a diameter ratio of about 4 to 3.

14. The wire nut wrench of claim 1 wherein said first cavity has a diameter of about one-half inch.

15. The wire nut wrench of claim 1 wherein said second cavity has a diameter of about three-eights inch.

* * * * *